June 9, 1953  L. E. BALDWIN  2,641,279
CONTROL VALVE FOR HYDRAULIC ACTUATING CYLINDERS
Filed June 10, 1948  2 Sheets-Sheet 1
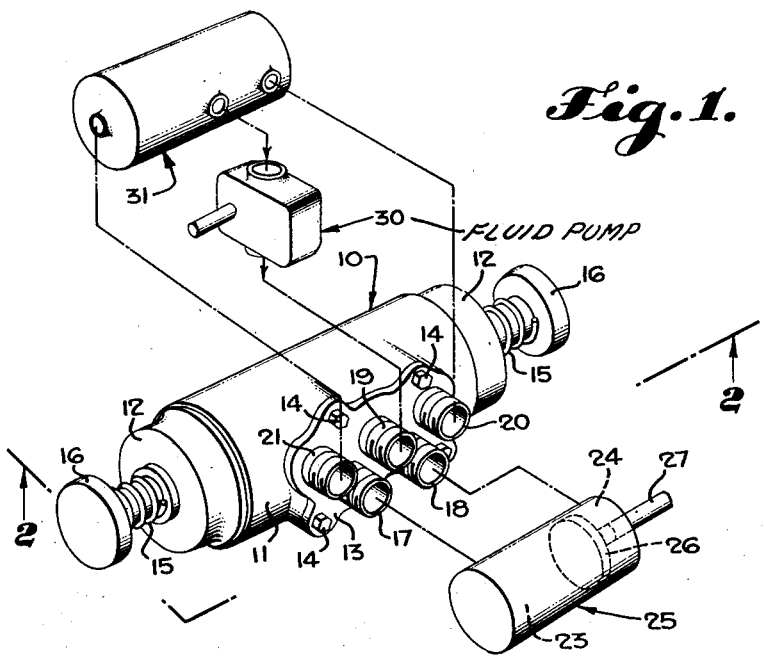
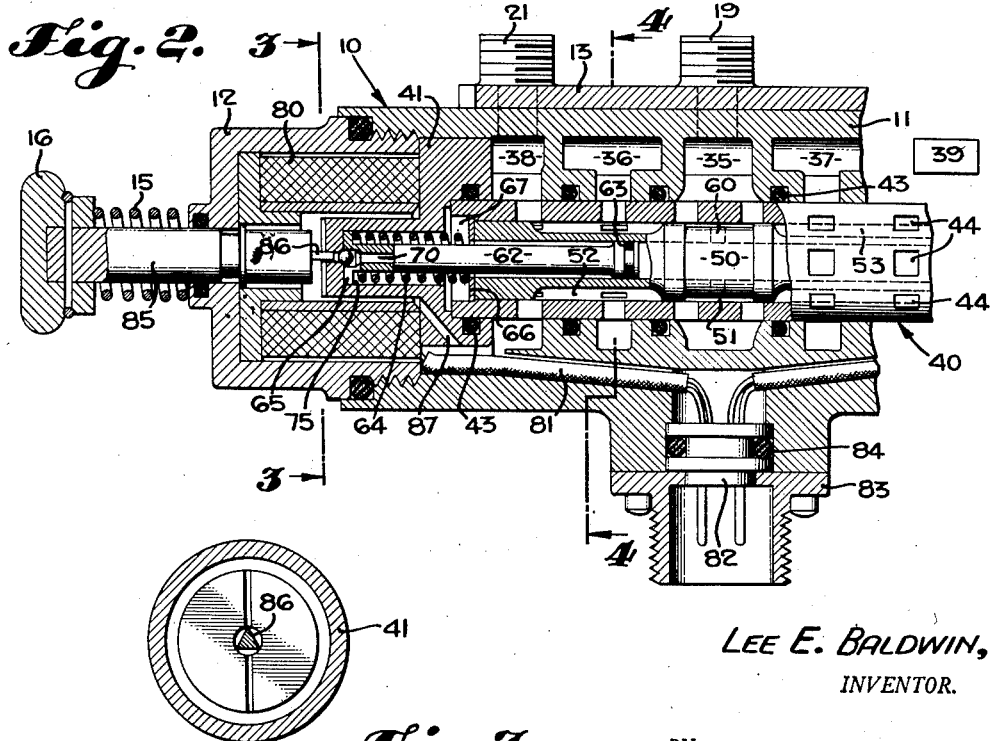
LEE E. BALDWIN,
INVENTOR.
BY Robert W. Fulwider
ATTORNEY June 9, 1953  L. E. BALDWIN  2,641,279
CONTROL VALVE FOR HYDRAULIC ACTUATING CYLINDERS
Filed June 10, 1948  2 Sheets-Sheet 2
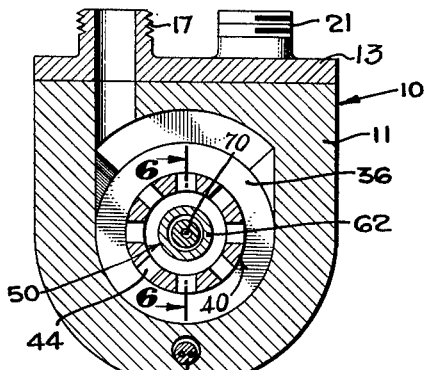
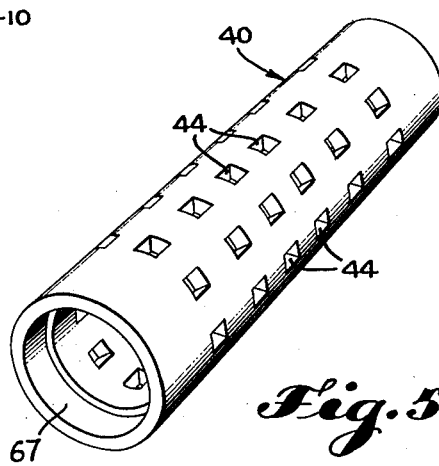
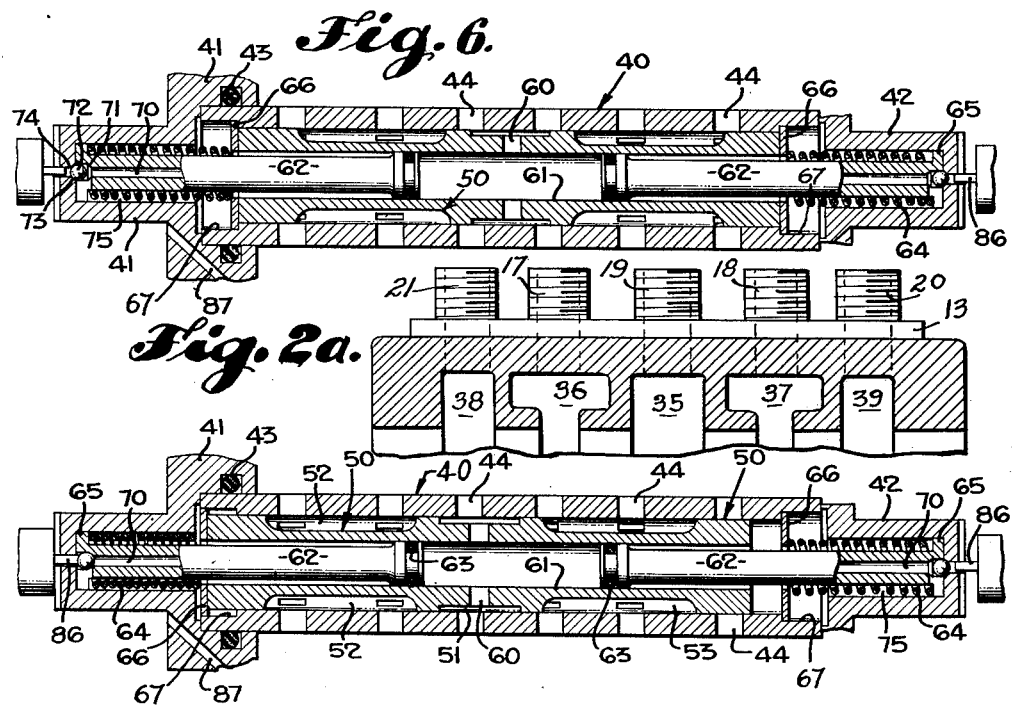
LEE E. BALDWIN,
INVENTOR.
BY Robert W Fulwider
ATTORNEY Patented June 9, 1953

2,641,279

UNITED STATES PATENT OFFICE 2,641,279

CONTROL VALVE FOR HYDRAULIC ACTUATING CYLINDERS

Lee E. Baldwin, Glendale, Calif., assignor to Weston Hydraulics, Limited, North Hollywood, Calif., a corporation of California Application June 10, 1948, Serial No. 32,178

9 Claims. (Cl. 137—623)

My invention relates generally to hydraulic control valves and more particularly to a valve of this class which is adapted for use in conjunction with a hydraulic actuating cylinder and which is characterized by a relatively low pressure drop across the valve.

The hydraulically powered controls in aircraft, in machine tools, and in many other devices, are often actuated by a double acting piston used in conjunction with a pump and fluid reservoir, a selector valve being employed in the hydraulic system to control the mechanical motion of the actuator piston.

The usual hydraulically powered actuating cylinder is so arranged that fluid may be introduced into the cylinder selectively on one or the other side of the piston, thus forcing the piston to move in one or the other direction as desired. Simultaneously with the introduction of fluid into the pressure or power side of the hydraulic cylinder, it is, of course, necessary to provide for the exit of fluid from the exhaust side of the piston or cylinder. It is desirable furthermore to accomplish this control of the hydraulic fluid in a single operation. It is in a valve for the just stated purpose that the present invention is embodied.

Selector valves of the type just described have been designed previously but have had certain disadvantages, particularly where rapid motion of the actuating piston is desired. It will be obvious that when such rapid motion is desired, the rate of flow of fluid into the power side of the cylinder and out of the exit side thereof must be relatively rapid. If the selector valve employed to control the entrance and exit of fluid presents an appreciable resistance to the flow of fluid therethrough, the rapid actuation of the piston is greatly impaired.

Bearing in mind the above stated difficulties, it is a major object of my invention to provide a selector valve for the purpose stated, in which the fluid pressure drop across the valve at relatively high rates of fluid flow, is relatively low.

Another object of my invention is to provide a valve of the class described which employs a hydraulic relay system in connection with a pair of solenoid valves whereby to make possible the electrical control of the selector valve.

Still another object of my invention is to provide a valve of the class described which may be either electrically or manually operated.

A still further object of my invention is to provide a valve of the class described which is relatively simple as to the number and complexity of its parts, and is relatively light in weight whereby to adapt the valve for use in aircraft hydraulic systems.

The foregoing and other objects and advantages of my invention will become apparent from a consideration of the following detailed description thereof, such description being considered in connection with the attached drawings, in which:

Figure 1 is a semi-schematic perspective view, illustrating a valve embodying my invention as incorporated in a simple hydraulic system;

Figure 2 is an enlarged elevational section taken on the line 2—2 in Figure 1;

Figure 2a is a semi-diagrammatic view of the valve similar to Figure 2 and showing certain fluid connections therein;

Figure 3 is an enlarged fragmentary elevational section, taken on the line 3—3 in Figure 2;

Figure 4 is an enlarged elevational section taken on the line 4—4 in Figure 2;

Figure 5 is a perspective view of a sleeve member employed in the device illustrated in Figures 1 and 2; and Figures 6 and 7 are operational drawings being fragmentary sections taken on the line 6—6 in Figure 4, portions of the device being eliminated from the drawings for purposes of clarity.

The valve assembly embodying my invention is indicated throughout the drawings by the reference character 10, and includes a main body member 11 of generally cylindrical shape, into the ends of which are threaded two identical end caps 12, the body 11 having in addition a flanged attachment member 13 secured to a side thereof by bolts 14. A pair of operating handles 16 is provided, each handle projecting from an end of the body 11. Compression springs 15 are mounted around the shanks of the handles 16 and adapted to urge the latter outwardly of the body 11.

The flanged attachment member 13 is provided with five threaded nipples 17—21, adapted to receive conventional tube fittings for connection of the valve 10 into a hydraulic system. The tube-connecting nipples 17 and 18 are, as shown in Figure 1, connected to the two ends of a double acting cylinder 25 having a piston 26 therein and a connecting rod 27 secured to the piston in the conventional manner. In installations where it is desired to maintain the rate of change of volume of the two portions of the cylinder 25 equal, an additional connecting rod can be secured to the piston to extend in the opposite direction from the connecting rod 27.

The centrally located attachment nipple 19 on the attachment member 13 is connected to a fluid pump 30 which pump is in turn connected for a supply of fluid to a reservoir 31. The pump 30 may be driven by any suitable power means (not shown) and serves to drive fluid in a direction indicated by the arrows placed on the dotted line fluid conduits indicated schematically in Figure 1. The end tube connection nipples 20 and 21 are connected to the reservoir 31 and serve to return fluid thereto.

In the following discussion, a power stroke of the piston 26 which draws the connecting rod toward the cylinder 25 will be referred to as a "pull stroke" and motion of the piston in the opposite direction will be referred to as a "thrust stroke." The portions of the cylinder 25 to the left and the right of the piston 26 in Figure 1 will be referred to as the upper and lower cylinder portions 23 and 24, respectively.

For a detailed description of the interior parts of the valve 10, reference should now be had to Figures 2 and 2a. Here it will be seen that the tube attachment nipples 17 through 21 communicate with various annularly shaped chambers within the body 11. These chambers, to be referred to hereinafter as manifolds, include a central pressure manifold 35 which communicates with the central attachment nipple 19, a pair of intermediate cylinder feed manifolds 36 and 37 which communicate with tube attachment nipples 17 and 18, respectively, and a pair of terminally located return manifolds 38 and 39 having communication with the end tube attachment nipples 21 and 20, respectively.

All the foregoing manifolds are cast within the body 11 and have a peculiar cross-sectional shape to be described later herein. A common inner wall for all of the manifold chambers 35 through 39 is formed by an internal sleeve 40 (shown separately in Figure 5) which is fixed within an interior bore of the body 11 and secured therein by a pair of end bushing members 41 and 42, which members are in turn secured in the body 11 by the end caps 12. Suitable O-ring gaskets 43 are provided surrounding the sleeve 40 at various points whereby to hermetically separate the various manifold chambers from each other.

Arranged in circumferential rings adjacent the internal opening of each of the manifold chambers are a series of square orifices 44 through the wall of the sleeve 40 which serve to communicate the annular chambers 35, 36, 37, 38 and 39 with the interior of the sleeve 40.

Within the sleeve 40 and slidable therein is a hollow and generally cylindrical member 50, referred to herein as a spool. It will be noted that the spool 50 has a number of exterior annular grooves 51, 52 and 53 therein, which form transition chambers arranged to underlie various groups of the orifices 44 as will be hereinafter described.

As above mentioned, the spool 50 is slidable longitudinally within the sleeve 40. It is the longitudinal sliding motion of the spool 50 which serves to intercommunicate various of the tube attachment nipples 17 through 21, thus to actuate the hydraulic cylinder 25 in the direction desired. The power required to move the spool 50 in one direction or the other is derived from the fluid pressure itself. To this end, the pressure manifold 35 is communicated through two rows of orifices 44 as indicated in Figure 2 into a central recess 51 in the spool 50 and thence through a radial passage 60 in the spool 50 into a central bore 61 thereof.

A pair of fixed piston-like members 62 project inwardly into the bore 61 and are provided at their inner ends with O-rings 63 whereby to form a hermetic seal with the interior bore 61 of the spool 50. The piston members 62 are secured in fixed position by compression springs 64 anchored against flanges 65 formed in their outer ends, the compression springs 64 thrusting at their inner ends against the ends of the spool 50, a washer 66 being interposed between the end of each spring and the corresponding end of the spool. It will be noted from an examination of Figure 2 that an enlarged interior recess 67 is formed in each end of the sleeve 40 to receive the washer 66. By this arrangement, it will be seen that either end of the spool 50, when moving outwardly, moves the washer 66 and thus encounters the thrusting resistance of the compression spring 64. Inward motion of the spool end, however, is not followed by inward motion of the washer 66.

The result of the above arrangement is that the spool 50 moves independently of the piston members 62, these members having sliding engagement with the interior bore 61 whereby to permit such motion of the spool 50.

The operation of the movable spool 50 will become apparent from an examination of Figures 6 and 7, wherein the spool is shown in two successive positions, that in Figure 6 being a neutral position, and that in Figure 7 the position wherein the spool has been moved to the left. Since the valve illustrated herein is bi-laterally symmetrical, a description of one mode of operation suffices to disclose the principle involved in all modes of operation.

Referring specifically to Figure 6, it will be seen that the piston members 62 are provided with interior bores 70 to permit axial passage of fluid therethrough. At the outer end of each of the piston members 62 is a valve seat 71 adapted to be closed by a check ball 72. Normally, the check ball 72 is held in an outward position against a second valve seat 73 formed in the inner end of an axial fluid passage 74 in the bushing member 41, the ball being held in this position by the fluid pressure transmitted through the axial passage 70 in the piston member 62. It should be noted that, by reason of the check ball 72 being in engagement with the seat 73, the fluid pressure within the spool 50 is confined to the generally cylindrical chambers 75 formed in the bushing members 41 adjacent the ends of the spool. Escape of fluid from the chambers 75 is prevented by the O-ring gaskets 43 which surround the sleeve 40 immediately adjacent its end.

It will also be noted that the end of the spool 50 forms a movable wall for the chamber 75 in each of the bushing members 41. Since the fluid pressure is equal in each of the chambers 75 and since the spool ends are the same diameter, the fluid pressures acting on the ends of the spool 50 balance each other and there is no resultant force tending to move the spool 50 in either direction so long as both of the check balls 72 are seated against the seats 73 in the bushing members 41.

Mounted within each of the end caps 12 is a solenoid coil 80, connected by suitable leads 81 to a four-conductor electrical connector 82, mounted on the lower side of the body 11 and being provided with a conventional threaded connector sleeve 83. The electrical connector plug 82 is sealed with an O-ring gasket 84 to prevent the escape of fluid from within the body 11.

Both the bushing member 41 and the shank 85 of the handle 16 are constructed of ferromagnetic material and since both of these members project within the solenoid coil 80 but are slightly separated therein, as best seen in Figure 2, a powerful magnetic attraction between the shank 85 and the bushing member 41 is effected when the solenoid coil 80 is energized. As seen in Figure 2, and as further illustrated in Figure 3, the shank 85 is provided at its inward end with a triangularly cross-sectioned thrust pin 86, which projects through the fluid passage 74 in position to thrust against the check ball 72 whenever the shank 85 is moved inwardly by the aforesaid magnetic attraction. Thus the effect of energizing the solenoid coil 80 is to compress the spring 15, allow the shank 85 to move inwardly, and move the thrust ball 72 from its position against the seat 73 inwardly against the valve seat 74 at the outer end of the axial passage 70.

The effect of such inward movement of the ball 72 is to prevent further passage of fluid through the axial passage 70 in the piston member 62 and to permit passage of fluid around the thrust pin 86, thence along the outer surface of the bushing member 41 through a passage 87 in to the fluid return manifold 38. By this escape of fluid through the passage 74, the fluid pressure in the particular chamber 75 in which the check ball 72 is actuated, is relieved, and furthermore, since the axial passage 70 in the piston member 62 is blocked, such fluid pressure is not replenished. Accordingly, the fluid pressure against one end of the spool 50 is relieved, and the result is that the fluid pressure acting on the opposite end causes the spool to be moved longitudinally as shown in Figure 7.

The result of longitudinal motion of the spool 50 will now be described. It will be remembered that the spool 50 is provided, in its exterior surface, with a number of circumferential grooves 51, 52 and 53. Considering the position of the spool 50 in Figure 7, it will be seen that the circumferential groove 52 underlies those orifices 44 which communicate with the intermediate manifold 36 and the terminal manifold 38. Thus it is possible for fluid to flow from the manifold 36 inwardly toward the spool, axially along the groove 52 and outwardly through orifices 44 into the terminal or fluid return manifold 38.

Recalling the connections of the fluid conduits, it will be seen that the result of this positioning of the circumferential groove 52 is to permit fluid to escape from the upper cylinder chamber 23 through the valve 10 and thence to the reservoir 31, permitting a "pull stroke" of the piston 26.

Of course, it is necessary, if the fluid is to move out of the upper cylinder chamber 23, that force be exerted by the piston 26. Such force, producing the aforesaid "pull stroke," is occasioned by the fact that the circumferential groove 53 in the spool 50 underlies orifices 44 in a manner to interconnect the fluid pressure manifold 35 with the intermediate manifold 37, thus to permit fluid from the pump 30 to pass through the valve and into the lower cylinder chamber 24.

It is obvious that motion of the spool in the direction opposite to that shown in Figure 7 is effected by actuating the solenoid at the right end of the spool as shown in Figure 7, producing a "thrust stroke" of the piston 26.

It will be noted from an examination of Figures 2 and 5 that the orifices 44 are square. The purpose in making these orifices square instead of round is to permit a maximum flow of fluid through the orifices while maintaining a minimum motion of the spool 50 required to close the orifices. One advantage of using square orifices at 44 is that such shape permits an optimum rate of flow consistent with a relatively short longitudinal dimension. Furthermore, square orifices are relatively simple to produce compared, for example, to transverse slots. While transverse slots would give a greater flow area, they would seriously interfere with the free sliding action of the spool 50. Thus, it has been found that the square shape gives optimum results in the valve shown.

As a further measure to reduce the fluid resistance in the valve 10, the manifolds 35 through 39 are tapered as indicated in Figures 2 and 4. In Figure 4, it will be seen that the upper approximately one-half of the manifold is of relatively great cross-section, since the fluid passing therethrough must be sufficient to supply not only the orifices 44 in the upper part of the sleeve 40 (as viewed in Figure 4) but must supply sufficient fluid to pass on around the sleeve 40 and into the orifices 44 along the lower portion of the periphery of the sleeve 40. In order to provide sufficient sealing surface of the body 11 against the sleeve 40, the intermediate manifolds 36 and 37 are made with an approximately T-shaped cross-section in their upper portions, as best seen in Figure 2.

The result of shaping the interior cross-section of the manifolds in the manner just described is to produce a more nearly laminar flow of the fluid therethrough in contra-distinction to the turbulent flow that is produced if the manifold has a uniform cross-section throughout their peripheral lengths. It has been found that the tapered cross-section of the manifolds very materially decreases the resistance to rapid flow of fluid therethrough.

It will be obvious that, should it be desired to manually operate the valve 10, manual pressure may be applied to either of the handles 16, having the effect of moving the check ball 72 in the same manner as that mode of operation achieved by means of the solenoid coil 80.

Thus it will be seen that I have provided a relatively simple, yet highly efficient, fluid control valve which, because of its minimum number of parts and its relatively light construction, is adapted for use in aircraft fluid controls.

While the device shown and described herein is fully capable of achieving the objects and providing the advantages hereinbefore stated, it will be realized that it is capable of considerable modification by those skilled in the art without departing from the spirit of the invention. Therefore, I do not means to be limited to the form shown and described, but rather to the scope of the appended claims.

I claim:

1. In a valve of the type having a housing with a connection to receive fluid under pressure and a member in said housing selectively movable in one of two directions to control the flow of said fluid under pressure, actuating means for said member comprising: closure means in said housing forming a pair of pressure chambers adjacent opposed surfaces of said member; fixed means in said housing in sliding, fluid tight contact with said member and cooperating therewith to form a pair of inlet passages through said member adapted to deliver said fluid under pressure from said connection into each of said pressure chambers; fixed means forming a pair of exit passages, one leading from each of said pressure chambers; a pair of flow check members each normally positioned in one of said chambers to block one of said exit passages; and means including a pair of separate actuators each positioned adjacent one of said pressure chambers to selectively move one of said flow check members out of said exit blocking position and into position to block one of said inlet passages whereby to empty and prevent refill of one of said pressure chambers, and permit movement of said control member under pressure from the other of said pressure chambers.

2. The construction set forth in claim 1 further characterized in that said last mentioned means includes a solenoid actuated thrust member.

3. The construction set forth in claim 2 further characterized in that said solenoid actuated member includes a handle to permit selective manual operation thereof.

4. A fluid valve of the class described, comprising in combination: a body having a cylindrical bore therein, said bore having annular recesses formed therein opening into said bore at spaced points therealong, and said recesses having a cross-sectional area which varies around the circumference thereof being relatively greatest at one point and relatively smallest at a point diametrically opposite therefrom; means forming a plurality of conduit connections on said body, each of said conduit connections being connected by a passage to said maximum area point in one of said recesses; a sleeve in said bore having a plurality of groups of circumferentially arranged square orifices formed therein, each of said groups underlying one of said recesses whereby to communicate the latter with the interior of said sleeve; gasket means surrounding said sleeve at intervals thereon between each of said recesses whereby to hermetically separate said recesses from each other except through said orifices; an axially slidable valving member in said sleeve having sealing contact with the interior wall thereof, said valving member having a plurality of annular exterior grooves therein adapted and positioned to underlie selected adjacent pairs of said orifice groups whereby to intercommunicate adjacent recesses; a pair of spring members engaged with said valving member and adapted to hold the same in a normally central position in which none of said recesses are intercommunicated; and operable means to move said valving member to various positions in said sleeve whereby to intercommunicate selected pairs of said conduit connections.

5. The construction set forth in claim 4 further characterized in that said last means includes: a pair of end caps in said body adapted to form a pressure chamber adjacent each end of said valving member; means including a fixed piston member in sliding, fluid tight contact with said member and forming fluid inlet passages through said valving member from one of said recesses, said inlet passages being adapted to conduct fluid under pressure into said pressure chambers, said piston member having a valve seat therein; other passage means leading from said pressure chambers to another of said recesses adapted to exhaust fluid from said pressure chambers; a check member in each of said chambers normally blocking the exhaust passage thereof, said check member being adapted to be moved to open said exhaust passage and against said valve seat to close said inlet passage whereby to permit said valving member to be moved by pressure in the opposite pressure chamber to one of said various positions; and thrust means including separate members adjacent each pressure chamber to move one or the other of said check members selectively.

6. The construction set forth in claim 5 further characterized in that said thrust means includes a pair of solenoid actuated thrust pins.

7. The construction set forth in claim 6 further characterized by said thrust pins each having a handle formed thereon to manually operate said valve.

8. In a valve of the type having a housing with a connection to receive fluid under pressure and a member in said housing selectively movable longitudinally in one of two directions to control the flow of said fluid under pressure, actuating means for said member comprising: closure means in said housing forming a pair of pressure chambers adjacent opposed end surfaces of said member; manifold means in said housing to receive fluid under pressure from said connection, said manifold means being connected and adapted to place said fluid under pressure in contact with a side surface of said member; means including a passage in said member to deliver said fluid under pressure to an inlet port in each of said pressure chambers; fixed means forming a pair of exit passages, one leading from each of said pressure chambers; a pair of flow check members each normally positioned in one of said chambers to block one of said exit passages; and a pair of actuators, one for each of said flow check members, each actuator being adapted to move its flow check member out of exit blocking position and into position to block the inlet port of its pressure chamber whereby to empty and prevent refill thereof and permit movement of said member under pressure from the other pressure chamber.

9. In a valve of the type having a housing with a connection to receive fluid under pressure and a valving member in said housing selectively movable longitudinally in one of two directions to control the flow of said fluid under pressure, actuating means for said member comprising: a pair of expansible chambers formed in said housing, each abutting an end of said valving member whereby movement of said valving member expands one chamber and contracts the other; a non-expansible fluid manifold in said housing to receive said fluid under pressure; means to place said fluid in contact with a side wall of said valving member; a fluid passage in said valving member connecting said manifold with an inlet port in each chamber; an exhaust port in each chamber; a flow check member in each chamber normally positioned by said fluid pressure to block the exhaust port in said chamber and movable from said normal position to open said exhaust port and close said inlet port; and externally operable control means to selectively move one or the other of said flow check members whereby to empty and prevent refill of the chamber in which said flow check member is moved and permit movement of said valving member.

LEE E. BALDWIN.

References Cited in the file of this patent

UNITED STATES PATENTS

| Number | Name | Date |
|---|---|---|
| 358,520 | Westinghouse | Mar. 1, 1887 |
| 393,596 | Westinghouse | Nov. 27, 1888 |
| 463,623 | Eichbaum | Nov. 24, 1891 |
| 867,774 | Weir | Oct. 8, 1907 |
| 910,092 | Simonds | Jan. 19, 1909 |
| 1,711,570 | Loomis | May 7, 1929 |
| 1,935,971 | Wuesthoff | Nov. 21, 1933 |
| 2,031,478 | Gray | Feb. 18, 1936 |
| 2,106,572 | Meagher | Jan. 25, 1938 |
| 2,363,111 | Bennett | Nov. 21, 1944 |
| 2,396,643 | Gonahl | Mar. 19, 1946 |
| 2,460,908 | Scott | Feb. 8, 1949 |